(12) United States Patent
Vishwakarma et al.

(10) Patent No.: US 11,921,735 B2
(45) Date of Patent: Mar. 5, 2024

(54) CONTEXT-AWARE MAINTENANCE WINDOW IDENTIFICATION

(71) Applicant: Dell Products, L.P., Round Rock, TX (US)

(72) Inventors: Rahul Deo Vishwakarma, Bangalore (IN); Vaideeswaran G, Bangalore (IN); Parmeshwr Prasad, Bangalore (IN); Hemant Ramesh Gaikwad, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 387 days.

(21) Appl. No.: 16/824,337

(22) Filed: Mar. 19, 2020

(65) Prior Publication Data

US 2021/0294800 A1    Sep. 23, 2021

(51) Int. Cl.
*G06F 16/2458* (2019.01)
*G06F 8/65* (2018.01)
*G06N 7/01* (2023.01)

(52) U.S. Cl.
CPC ............ *G06F 16/2477* (2019.01); *G06F 8/65* (2013.01); *G06N 7/01* (2023.01)

(58) Field of Classification Search
CPC ........ G06F 8/65; G06F 16/2477; G06N 7/005
USPC ....................................................... 707/758
See application file for complete search history.

(56) References Cited

U.S. PATENT DOCUMENTS

| | | | |
|---|---|---|---|
| 2013/0060816 A1* | 3/2013 | Hui | G06F 16/86 707/E17.098 |
| 2013/0237184 A1* | 9/2013 | Cattan | H04W 8/08 455/406 |
| 2015/0231638 A1* | 8/2015 | Mancuso | B02C 25/00 241/43 |
| 2016/0162280 A1* | 6/2016 | Murayama | G06F 8/65 717/170 |
| 2016/0173292 A1* | 6/2016 | McCoy | H04L 65/403 348/14.08 |
| 2020/0184278 A1* | 6/2020 | Zadeh | G06N 3/044 |

OTHER PUBLICATIONS

Silva et al.: "Probabilistic Forecasting With Fuzzy Time Series", Date of publication Jun. 11, 2019, IEEE Transactions on Fuzzy Systems, vol. 28, No. 8, Aug. 2020, hereafter "Silva" (Year: 2019).*

* cited by examiner

*Primary Examiner* — Kuen S Lu
(74) *Attorney, Agent, or Firm* — Fogarty LLP

(57) ABSTRACT

Systems and methods are provided for context-aware maintenance window identification. In some embodiments, an Information Handling System (IHS) may include a processor and a memory coupled to the processor, the memory having program instructions stored thereon that, upon execution, cause the IHS to: estimate a completion time of a maintenance operation; predict future usage of the IHS; identify a time window for the maintenance operation based upon the estimation and the prediction.

18 Claims, 9 Drawing Sheets

400

| TIME | CPU | %USER | %NICE | %SYSTEM | %IOWAIT | %STEAL | %IDLE |
|---|---|---|---|---|---|---|---|
| 0:05:05 | ALL | 29.41 | 0 | 2.22 | 1.15 | 0 | 67.21 |
| 0:10:05 | ALL | 26.59 | 0 | 2.47 | 1.78 | 0 | 69.15 |
| 0:15:05 | ALL | 27.24 | 0 | 2.04 | 1.43 | 0 | 69.29 |
| 0:20:05 | ALL | 26.28 | 0 | 1.96 | 0.6 | 0 | 71.16 |
| 0:25:05 | ALL | 26.75 | 0 | 2.05 | 0.88 | 0 | 70.32 |
| 0:30:05 | ALL | 26.59 | 0 | 1.94 | 0.39 | 0 | 71.08 |
| 0:35:05 | ALL | 26.65 | 0 | 2.06 | 2.53 | 0 | 68.76 |
| 0:40:05 | ALL | 29.28 | 0 | 1.49 | 0.82 | 0 | 68.4 |
| 0:45:05 | ALL | 27.98 | 0 | 1.9 | 1.65 | 0 | 68.47 |
| 0:50:05 | ALL | 27.72 | 0 | 2.07 | 2.32 | 0 | 67.89 |
| 0:55:05 | ALL | 27.84 | 0 | 1.89 | 1.82 | 0 | 68.45 |
| 1:00:05 | ALL | 28.03 | 0 | 1.6 | 1.3 | 0 | 69.08 |
| 1:05:05 | ALL | 26.93 | 0 | 2.21 | 2.12 | 0 | 68.74 |
| 1:10:05 | ALL | 27.99 | 0 | 1.86 | 1.58 | 0 | 68.57 |
| 1:15:05 | ALL | 27.61 | 0 | 2.13 | 2.2 | 0 | 68.07 |
| 1:20:05 | ALL | 27.44 | 0 | 1.9 | 1.61 | 0 | 69.06 |
| 1:25:05 | ALL | 27.57 | 0 | 1.52 | 1.59 | 0 | 69.32 |
| 1:30:05 | ALL | 29.67 | 0 | 2.08 | 1.21 | 0 | 67.04 |
| 1:35:05 | ALL | 28.49 | 0 | 2.38 | 1.85 | 0 | 67.28 |
| 1:40:05 | ALL | 29.12 | 0 | 1.97 | 1.1 | 0 | 67.82 |
| 1:45:05 | ALL | 26.36 | 0 | 2.15 | 0.9 | 0 | 70.59 |
| 1:50:05 | ALL | 28.75 | 0 | 1.93 | 0.7 | 0 | 68.61 |
| 1:55:05 | ALL | 29.49 | 0 | 2.23 | 1.2 | 0 | 67.08 |
| 2:00:05 | ALL | 27.48 | 0 | 2 | 0.7 | 0 | 69.82 |
| 2:05:05 | ALL | 29.14 | 0 | 2.26 | 1.44 | 0 | 67.15 |

FIG. 4

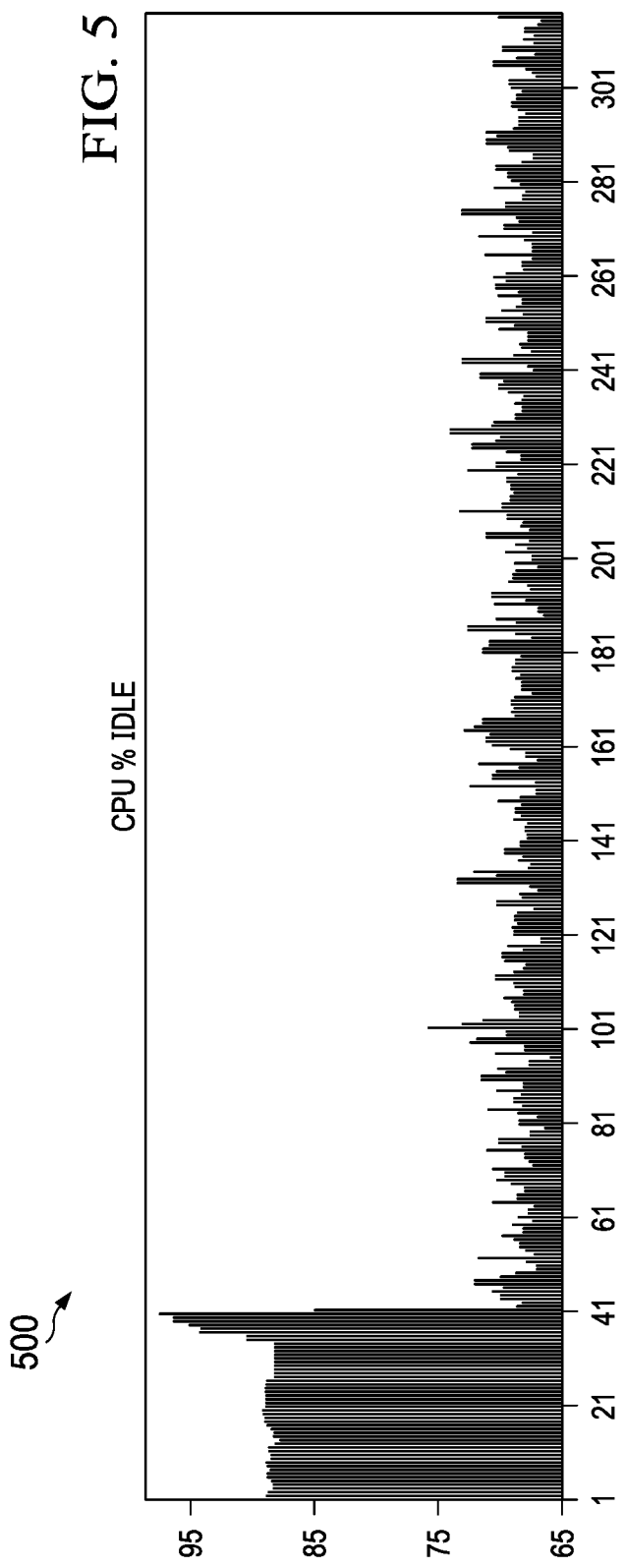

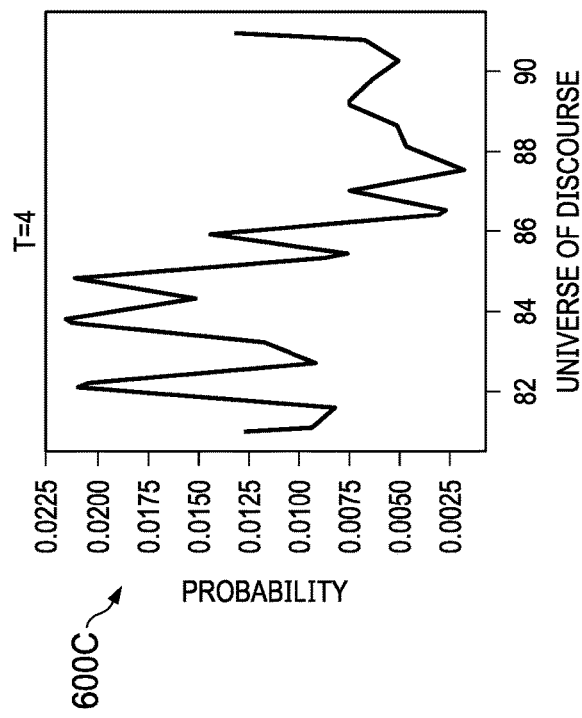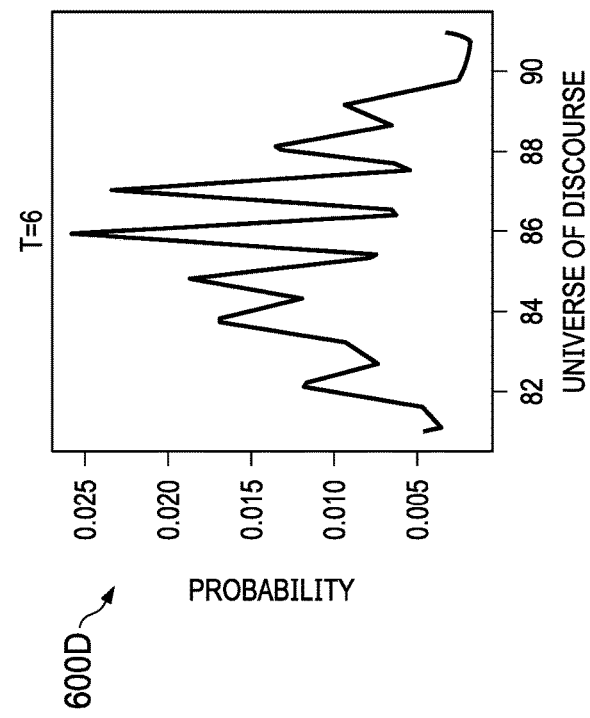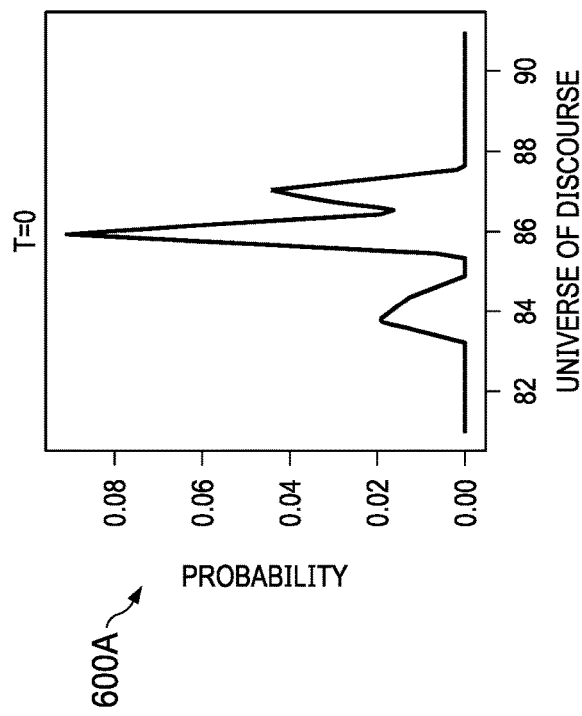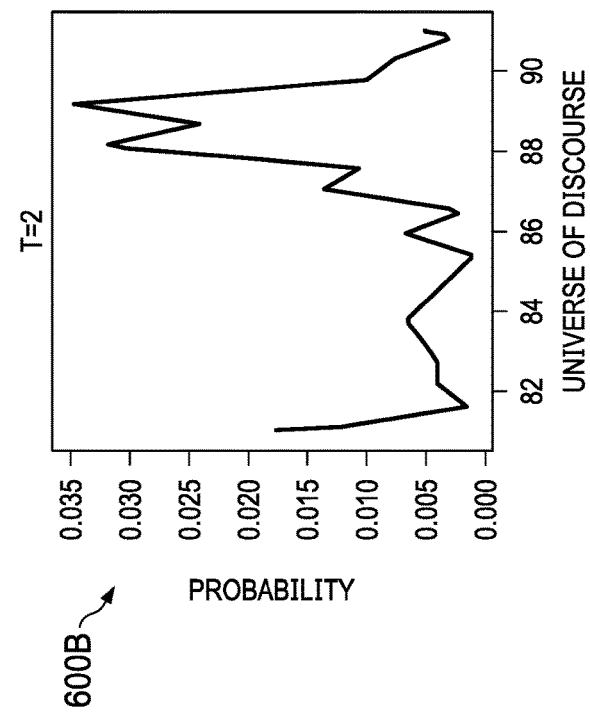
FIG. 6A

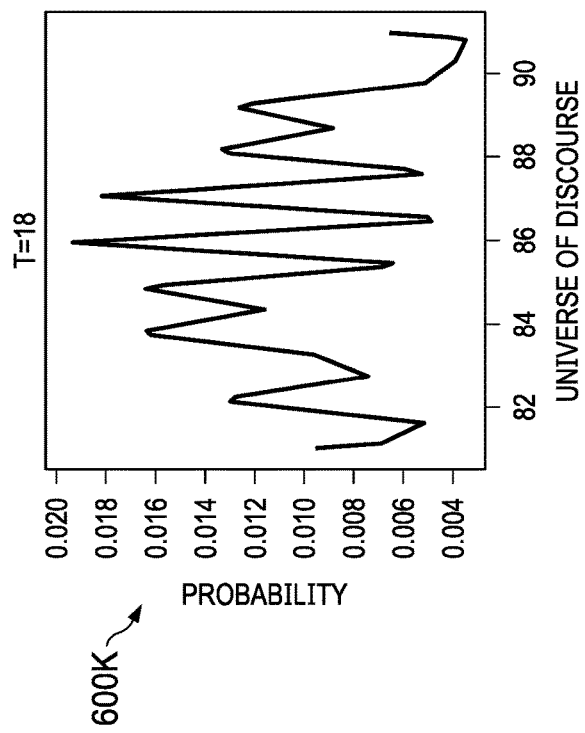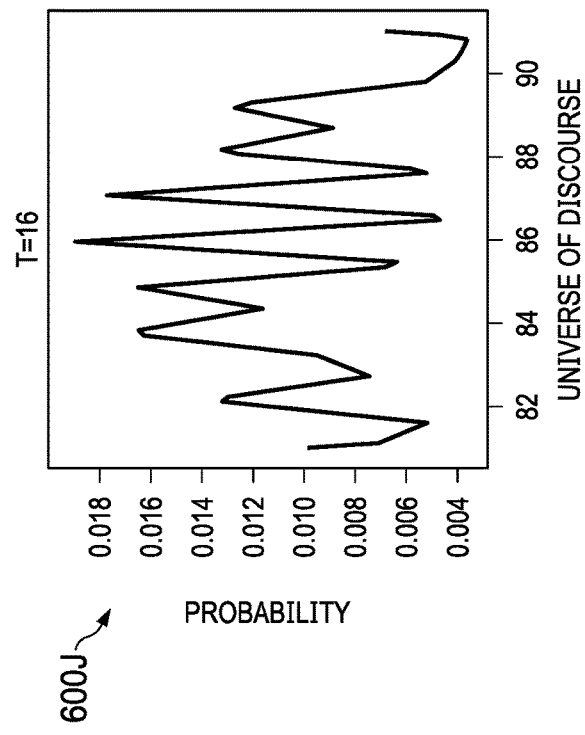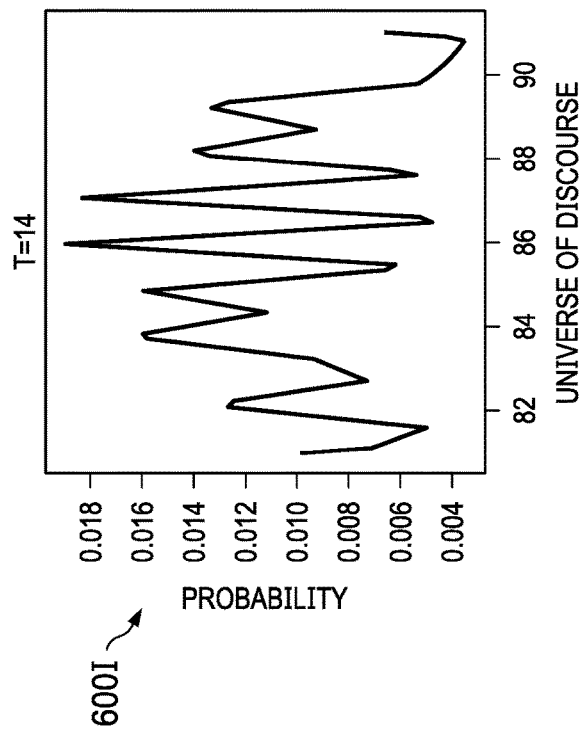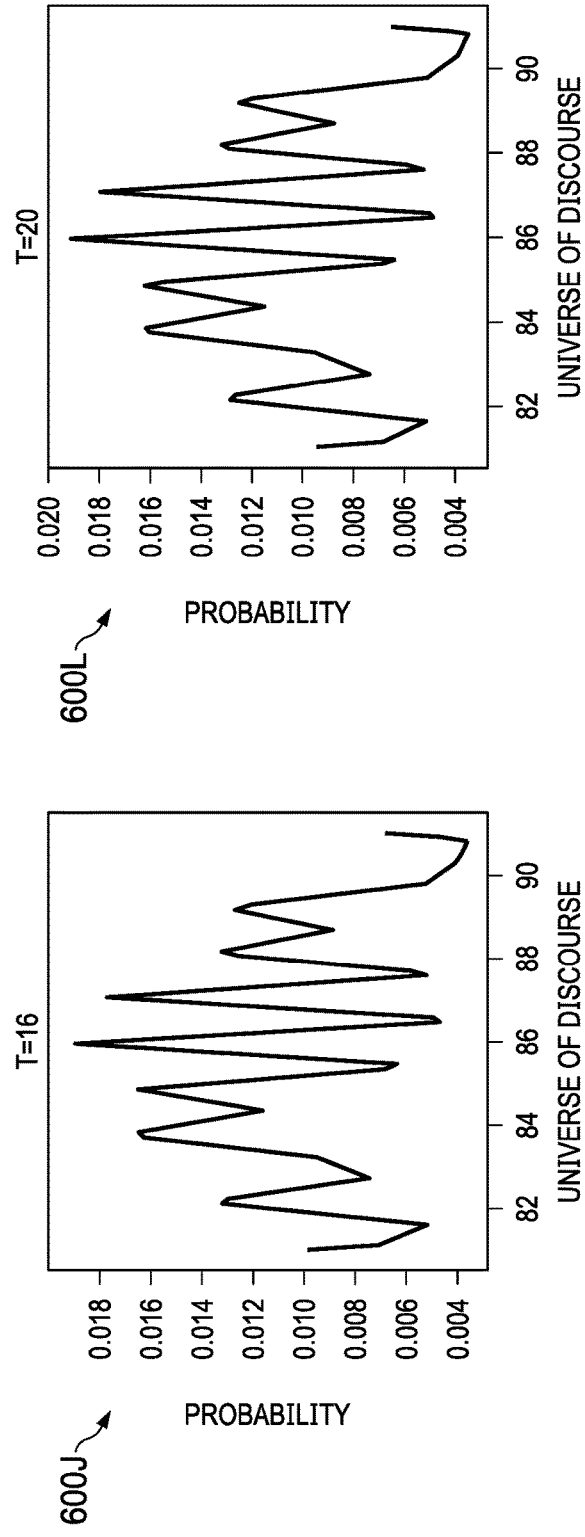
FIG. 6C

CONTEXT-AWARE MAINTENANCE WINDOW IDENTIFICATION

FIELD

This disclosure relates generally to Information Handling Systems (IHSs), and more specifically, to systems and methods for context-aware maintenance window identification.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS typically comprises hardware components that utilize firmware instructions. The firmware instructions of a hardware component may be stored in a non-volatile memory that is integral to the hardware component. In various scenarios, firmware utilized by a hardware component may be updated, as a matter or maintenance routine, to correct errors and/or to improve the performance of the component. In networked environments, for example, firmware may be updated remotely. An IHS administrator or an automated script may push firmware update packages to the IHS's hardware component to initiate a firmware update operation.

As the inventors hereof have recognized, firmware updates have traditionally been performed based upon intuitively-defined maintenance window schedules, and all updates are piled up until that window schedule. For example, maintenance windows are often determined based on off-business hours or region-specific holidays. With hypervisor clusters or Hyperconverged Infrastructure (HCI) systems, however, where the number of components involved is high and interleaved, the traditional maintenance window approach can cause long hours of service disruption—not just for entire update to complete, but also to identify which workloads are running on which IHS within a cluster, and plan the shutdown(s) accordingly. In short, conventional firmware update or maintenance window planning happens agnostic to workloads and/or clustering.

SUMMARY

Systems and methods for context-aware maintenance window identification are described. In some embodiments, an Information Handling System (IHS) may include a processor and a memory coupled to the processor, the memory having program instructions stored thereon that, upon execution, cause the IHS to: estimate a completion time of a maintenance operation; predict future usage of the IHS; identify a time window for the maintenance operation based upon the estimation and the prediction. For example, the maintenance operation may include a firmware update operation.

To estimate the completion time, the program instructions, upon execution, may cause the IHS to obtain historical logs of previous maintenance operations, the historical log comprising different completion times for different maintenance operations. Additionally, or alternatively, to estimate the completion time, the program instructions, upon execution, may cause the IHS to add a first completion time of a first maintenance operation to a second completion time of a second maintenance operation. Additionally, or alternatively, to estimate the completion time, the program instructions, upon execution, may cause the IHS to add a time buffer to the first and second completion times.

To predict the future usage, the program instructions, upon execution, may cause the IHS to use a multivariate time series analysis. The multivariate time series analysis may include a probabilistic weighted fuzzy time series. To use the multivariate time series analysis, the program instructions, upon execution, may cause the IHS to use one or more parameters selected from the group consisting of: external input/output (I/O) attributes, internal I/O attributes, processor usage statistics, and memory consumption statistics.

To identify the time window, the program instructions, upon execution, may cause the IHS identify future transitions between different IHS usage levels. Additionally, or alternatively, to identify the time window, the program instructions, upon execution, may cause the IHS to remove one or more spikes from the predicted future usage. To predict the usage, the program instructions, upon execution, may cause the IHS to apply a weight to the completion time based upon context information. The context information may include a distance of a user of the IHS, a posture of the IHS, and/or a hinge angle.

In another illustrative, non-limiting embodiment, a memory storage device may have program instructions stored thereon that, upon execution by one or more processors of an IHS, cause the IHS to: estimate a completion time of a firmware update operation; predict future usage of the IHS using a multivariate time series analysis; and identify a time window for the firmware update operation based upon the estimation and the prediction. In yet another illustrative, non-limiting embodiment, a method may include: estimating a completion time of a firmware update operation; predicting future usage of the IHS using a probabilistic weighted fuzzy time series; and identifying a time window for the firmware update operation based upon the estimation and the prediction.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 is a table of example of historical data collected as a time series, according to some embodiments.

FIG. 5 is a graph of example of historical data collected as a time series, according to some embodiments.

FIGS. 6A-C are graphs of example results from a prediction or forecasting operation, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
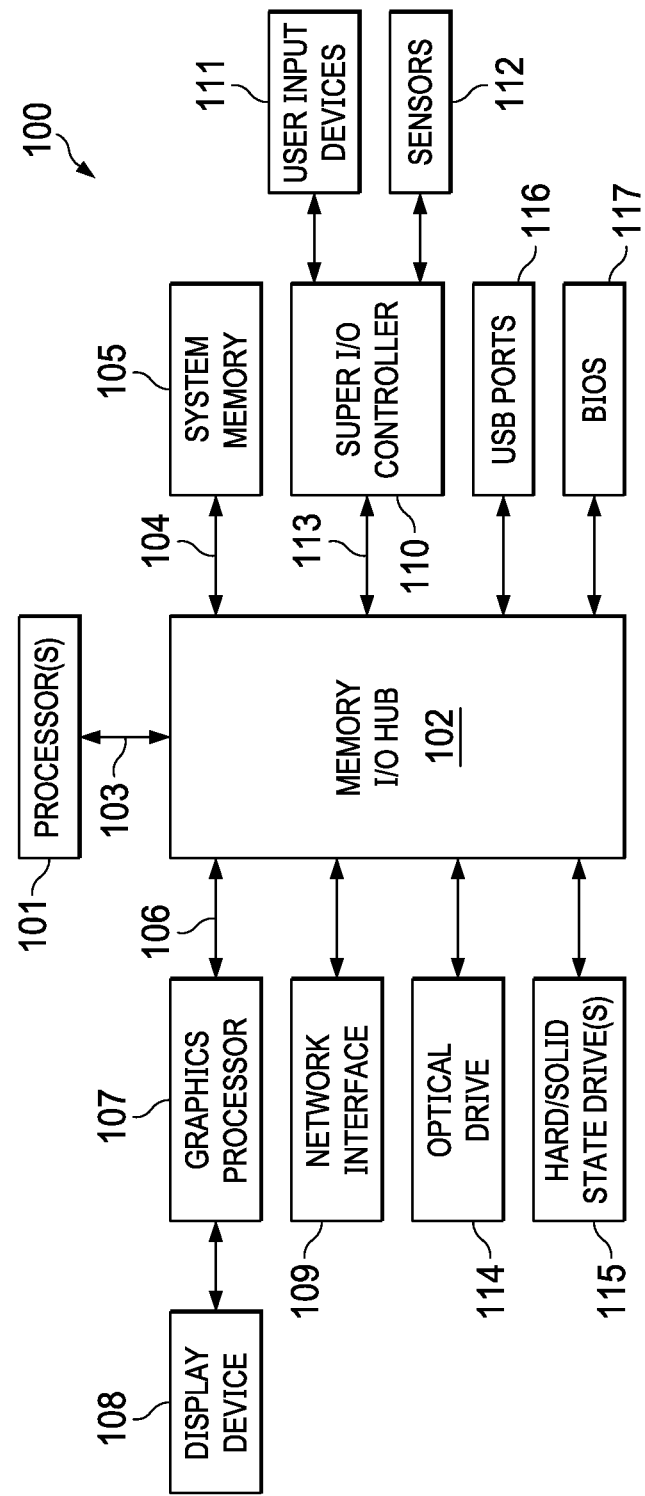
FIG. 1 is a block diagram illustrating an example of an Information Handling System (IHS) configured for identifying a safe window for creating a firmware update package, according to some embodiments.

FIG. 1 shows an example of an IHS configured to implement the systems and methods described herein according to certain embodiments. It should be appreciated that although certain implementations described herein are discussed in the context of a server computer or personal computer (e.g., laptop, desktop, tablets, etc.), other IHS implementations may be utilized. In this example, IHS 100 is configured to perform context-aware maintenance window identification, as explained in more detail below.

Particularly, IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes a memory I/O hub chipset 102 comprising one or more integrated circuits that connect to processor(s) 101 over a front-side bus 103. Memory I/O hub 102 provides the processor(s) 101 with access to a variety of resources. For instance, memory I/O hub 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), synchronous dynamic RAM (SDRAM), nonvolatile/Flash-type memory, or any other type of memory.

Memory I/O hub 102 may also provide access to graphics processor 107. In certain embodiments, graphics processor 107 may be comprised within one or more video or graphics cards that have been installed on IHS 100. Graphics processor 107 may be coupled to memory I/O hub 102 via graphics bus 106 such as provided an AGP (Accelerated Graphics Port) bus or a PCI (Peripheral Component Interconnect or) bus. In certain embodiments, graphics processor 107 generates display signals and provides them to coupled display device 108.

In certain embodiments, memory I/O hub 102 may also provide access to one or more user input devices 111. In such embodiments, memory I/O hub 102 may be coupled to a super I/O controller 110 that provides interfaces for variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. In certain embodiments, super I/O controller 110 may also provide an interface for communication with one or more sensor devices 112, which may include environment sensors, such as a temperature sensor or other cooling system sensor. The I/O devices, such as user input devices 111 and sensor devices 112, may interface super I/O controller 110 through wired or wireless connections. In certain embodiments, super I/O controller 110 may be coupled via a Low Pin Count (LPC) bus 113.

Other resources may also be coupled to IHS 100 through memory I/O hub 102. In certain embodiments, memory I/O hub 102 may be coupled to network interface 109, such as provided by a Network Interface Controller (NIC). According to various embodiments, network interface 109 may support communication via various wired and/or wireless networks. Memory I/O hub 102 may also provide access to one or more hard disk and/or solid state drives 115. In certain embodiments, access may be provided to optical drive 114 or other removable-media drive. Any or all of drive devices 114 and 115 may be integral to IHS 100, or may be located remotely from IHS 100. In certain embodiments, access may be provided to one or more Universal Serial Bus (USB) ports 116.

Another resource that may be accessed by processor(s) 101 via memory I/O hub 102 is BIOS 117. The BIOS 117 provides an abstraction layer for interfacing with certain hardware components that are utilized by IHS 100. Via this hardware abstraction layer provided by BIOS 117, the software executed by the processor(s) 101 of IHS is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. Upon booting of the IHS 100, processor(s) 101 may utilize BIOS 117 instructions to initialize and test hardware components coupled to the IHS and to load an Operating System (OS) for use by IHS 100.

Sensors 112 may provide access to data describing environmental and operating conditions of IHS 100 (e.g., accelerometers, gyroscopes, hinge sensors, rotation sensors, hall effect sensors, lid sensors, temperature sensors, voltage sensors, current sensors, IR sensors, photosensors, proximity sensors, distance sensors, magnetic sensors, microphones, ultrasonic sensors, etc.).

In some cases, processor(s) 101 may be configured to use context information collected by sensors 112 to determine the relative orientation and movement of IHS 100. For instance, the sensor hub may utilize inertial movement sensors, that may include accelerometer, gyroscope, and magnetometer sensors, and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, processor(s) 101 may also determine a location and movement of IHS 100 based on triangulation of network signal and based on network information provided by the OS or network interface. In some embodiments, processor(s) 101 may support additional sensors, such as optical, infrared and sonar sensors, that may provide support for xR (virtual, augmented, and/or mixed reality) sessions hosted by IHS 100 and may be used to provide an indication of a user's presence near IHS 100, such as whether a user is present, absent, and/or facing an IHS display.

In cases where an end-user is present before IHS 100, processor(s) 100 may further determine a distance of the end-user from the IHS, where this determination may be made continuously, at periodic intervals, or upon request. The detected or calculated distances may be used by processor(s) 100 to classify the user as being in the IHS's near-field (user's position<threshold distance A), mid-field (threshold distance A<user's position<threshold distance B, where B>A), or far-field (user's position>threshold distance C, where C>B).

In embodiments where IHS 100 may support multiple physical configurations, such as a convertible laptop, N-in-1 device, or the like, processor(s) 100 may utilize one or more mode sensors 112 that collect readings that may be used in determining the current posture in which IHS 100 is physically configured. In certain embodiments, such posture determinations may be additionally made using the movement and orientation information provided by sensors 112.

In laptop and convertible laptop embodiments, for example, processor(s) 100 may utilize a lid position sensor 112 to determine the relative angle between the two panels of the laptop in order to determine the mode in which IHS 100 is physically configured. In such embodiments, lid position sensor 112 may measure the angle of rotation of the hinge that connects the base panel and lid panel of IHS 100. In some cases, processor(s) 100 may collect lid position information, such as the hinge angle, to then use in determining the posture in which IHS 100 is configured.

Processor(s) 100 may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. Processor(s) 100 may additionally utilize orientation and movement information collected from inertial movement sensors 112 to further determine the posture in which IHS 100 is physically configured. For instance, if processor(s) 100 determine that IHS 100 is configured with a hinge angle of a laptop configuration, but IHS 100 is oriented on its side, IHS 100 may be determined to be in a book mode. If IHS 100 is determined to be tilted such that the hinge is oriented between horizontal and vertical, the user's face is detected to be facing the integrated display, and IHS 100 is experiencing slight movement, processor(s) 100 may determine that IHS 100 is being used in a book posture. Processor(s) 100 may determine that IHS 100 is opened to a 180-degree hinge angle and lies on a flat surface, thus indicating that IHS 100 it is being used in a landscape posture. Processor(s) 100 may similarly determine that IHS 100 is in a tent configuration, in response to detecting a hinge angle within a defined range, such as between 300 and 345 degrees, such that the hinge is aligned horizontally and is higher than both display panels of IHS 100.

In some implementations, IHS 100 may not include each of the components shown in FIG. 1. In other implementations, IHS 100 may include other components in addition to those that are shown in FIG. 1. Furthermore, some components that are represented as separate components in FIG. 1 may instead be integrated with other components. For example, all or a portion of the functionality provided by two or more discrete components may instead be provided by components that are integrated into processor(s) 100 as a systems-on-a-chip.

Figure 2:
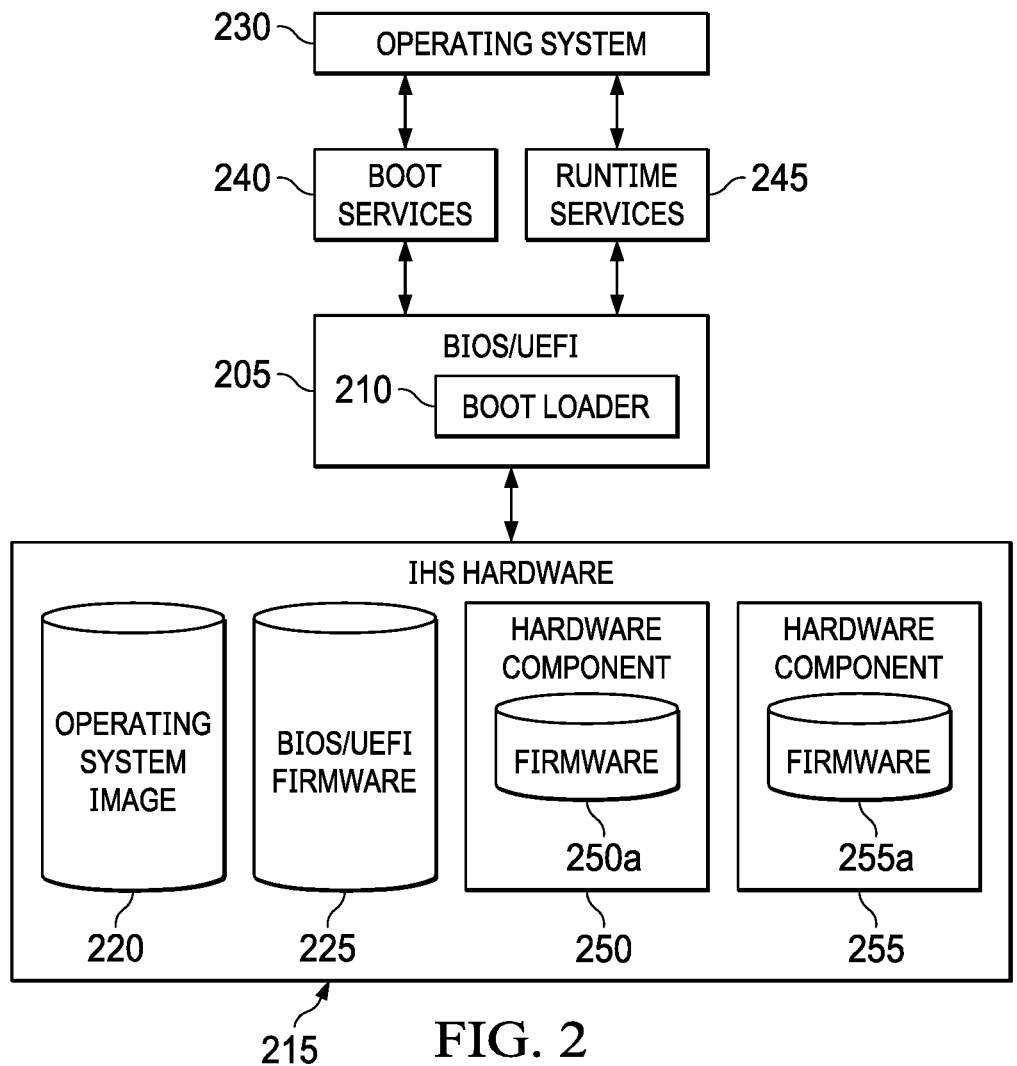
FIG. 2 is a block diagram depicting software and hardware components of an IHS configured for identifying a safe window for creating a firmware update package, according to some embodiments.

FIG. 2 illustrates certain aspects of the operation of BIOS 117 that is described above with respect to the IHS of FIG. 1, for example in connection with a maintenance operation. In particular FIG. 2 illustrates the initialization and operation of BIOS 205. Upon being powered, an IHS accesses the BIOS firmware 225 that is stored in memory, such as the system memory accessible to the processor(s) of the IHS. BIOS firmware 225 is used by an IHS to initialize BIOS process 205. As described above, the BIOS of an IHS provides instructions that are utilized to interface with certain of the IHS hardware components 215 that are coupled to the IHS. Individual hardware components 215 may be coupled to the IHS via a range of techniques, ranging from fixed integrated circuits to ad hoc wireless connections. In the illustrated example, four hardware components 220, 225, 250, 255 are discussed. Other IHSs may have various other combinations of hardware components.

As described above with respect to FIG. 1, an IHS may utilize a memory I/O hub in order to access various resources, including system memory and one or more storage drives, such as hard disk drives. Upon being initialized, BIOS 205 utilizes a boot loader 210 that is configured to identify and boot an operating system for use by the IHS. The boot loader 210 utilizes the memory I/O hub to access an operating system image 220 that is stored in a storage device, such as a hard disk drive, that is coupled to the IHS. In certain scenarios, the boot loader 210 may be configured to load only certain modules of the operating system image 220. In certain scenarios, the boot loader 210 may also initialize a boot services process 240 that is configured to provide the basic I/O and file operations that are needed to boot the operating system 230.

Once operating system 230 is booted and properly configured to interface with the IHS hardware components 215, BIOS 205 may be configured to transition from the use of boot services 240 used during booting to runtime services 245 that are configured to provide instructions for I/O and file operations to be utilized by the booted operating system 230. In certain scenarios, various combinations of EFI and BIOS modules may be present in the BIOS 205. In such scenarios, an IHS may support various combinations features from of each of the EFI and BIOS firmware interfaces.

Referring back to FIG. 2, two additional hardware components 250 and 255 are illustrated. Each of these two hardware components 250 and 255 include integral memory devices that are used to store firmware 250a and 255a that is configured to allow each of the respective hardware components 250 and 255 to interface with the operating system 230. Moreover, the firmware for the hardware components 250a and 255a, as well as the firmware for BIOS 225, may be occasionally updated with instructions contained in one or more firmware update packages, which may be received, for example, from a firmware update package creation service over a network (i.e., a remote server executing a software application configured to produce firmware update packets).

Figure 3:
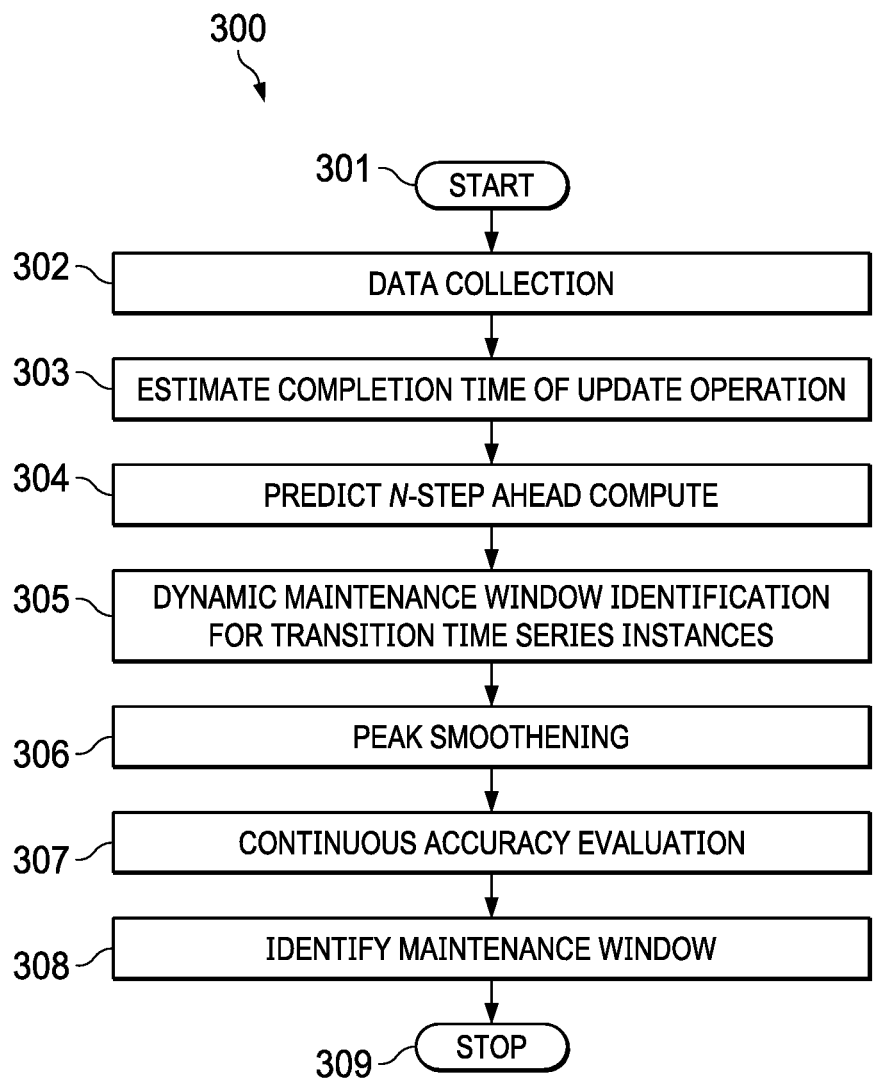
FIG. 3 is a flowchart of an example of a method for context-aware maintenance window identification, according to some embodiments.

FIG. 3 is a flowchart of an example of method 300 for context-aware maintenance window identification. In some embodiments, method 300 may be performed by processor(s) 101 of IHS 100 in response to the execution of program instructions stored in memory 105. Generally, method 300 may be used to identify and/or prompt a user about a maintenance window that improves or maximizes the probability of success of a maintenance operation (e.g., a firmware update operation) with reduced or minimal impact on IHS performance and/or availability.

In various embodiments, maintenance window identification of method 300 may be performed autonomously based on multivariate time series forecasting of various IHS compute and/or execution load attributes or parameters, such as, for example: external I/O (e.g., intra north-south inward or outward traffic on specific IP address, mac address, IPs/ports from specific regions, etc.), internal I/O (e.g., inter east-west virtual machine (VM)-to-VM workload traffic on a specific IP address, mac address, ports, etc.), processor 101's usage statistics, memory 105's consumption statistics, or the like. In some implementations, with varied weightage for each parameter for a prolonged duration of IHS usage, method 300 may analyze and predict the exact future timelines when an IHS may be shut down for maintenance with least impact to any services running on that system.

Particularly, method 300 begins at block 301 and ends at block 309. At block 302, method 300 may perform one or more data collection operations. Data from each managed device is collected for prolonged duration and translated into time series data, which is provided as input for an n-step ahead forecast engine. Examples of such data include, but are not limited to: external I/O (e.g., intra north-south inward or outward traffic on specific IP address, mac address, IPs/ports from specific regions, etc.), internal I/O (e.g., inter east-west virtual machine (VM)-to-VM workload traffic on a specific IP address, mac address, ports, etc.), processor 101's usage statistics, memory 105's consumption statistics.

In some cases, CPU, memory, I/O, and network data may be further filtered based on other parameters including, but not limited to, workloads getting external requests from same or different regions, workloads getting internal requests from same or different regions, and/or workloads getting internal or external requests from specific IP addresses at a specific time duration of the day. These additional parameters may be used to understand and predict access patterns for various workloads and data related to region specific holidays and vacations, for example. Moreover, other context information (e.g., user's distance from IHS, IHS posture, hinge angle, etc.) may also be collected at block 302.

As such, method 300 may be used to identify the continuous timeslots where compute resources are idling for a sufficient amount of time for IHS 100 to perform a firmware update or other maintenance operation for that specific IHS. For instance, a suitable indicator may be a CPU's idle % for a given IHS.

At block 303, method may estimate completion time of a maintenance or firmware update operation. Across multiple update operations performed for several devices, update statistics are generated for each component in each IHS. The completion time duration for a specific operation can be computed, for example, using a random forest regression.

As such, method 300 may collect the time taken for every update operation in IHS 100. Shown in Table I below is sample data for update completion for a device component with different payload sizes:

TABLE I

| Update Package Size | Completion Time |
|---|---|
| 1200 Kb | 4.3 minutes |
| 870 Kb | 3.1 minutes |
| 2680 Kb | 9.8 minutes |

Updates may be performed for several components on a device sequentially, hence the cumulative sum of all the component update for specific components on a specific IHS may be calculated for multiple update instances of the same component with same or varying payload data. The dataset of Table I may be used to train a model and for any new update request, time taken for the completion of the update operation may be predicted for both individual components or combinations of components.

In order to address run-level variations, an additional buffer % may be added to the overall operation completion time. For example, assume that the time taken for an operation is 10 mins, and the buffer is set to 20%. In this case, the overall operation completion time may be: Overall operation completion time=(Actual completion time+buffer %). In the example of Table I above, the overall operation completion time would be (10+(20% of 10))=(10+2)=12 minutes.

Figure 6B:
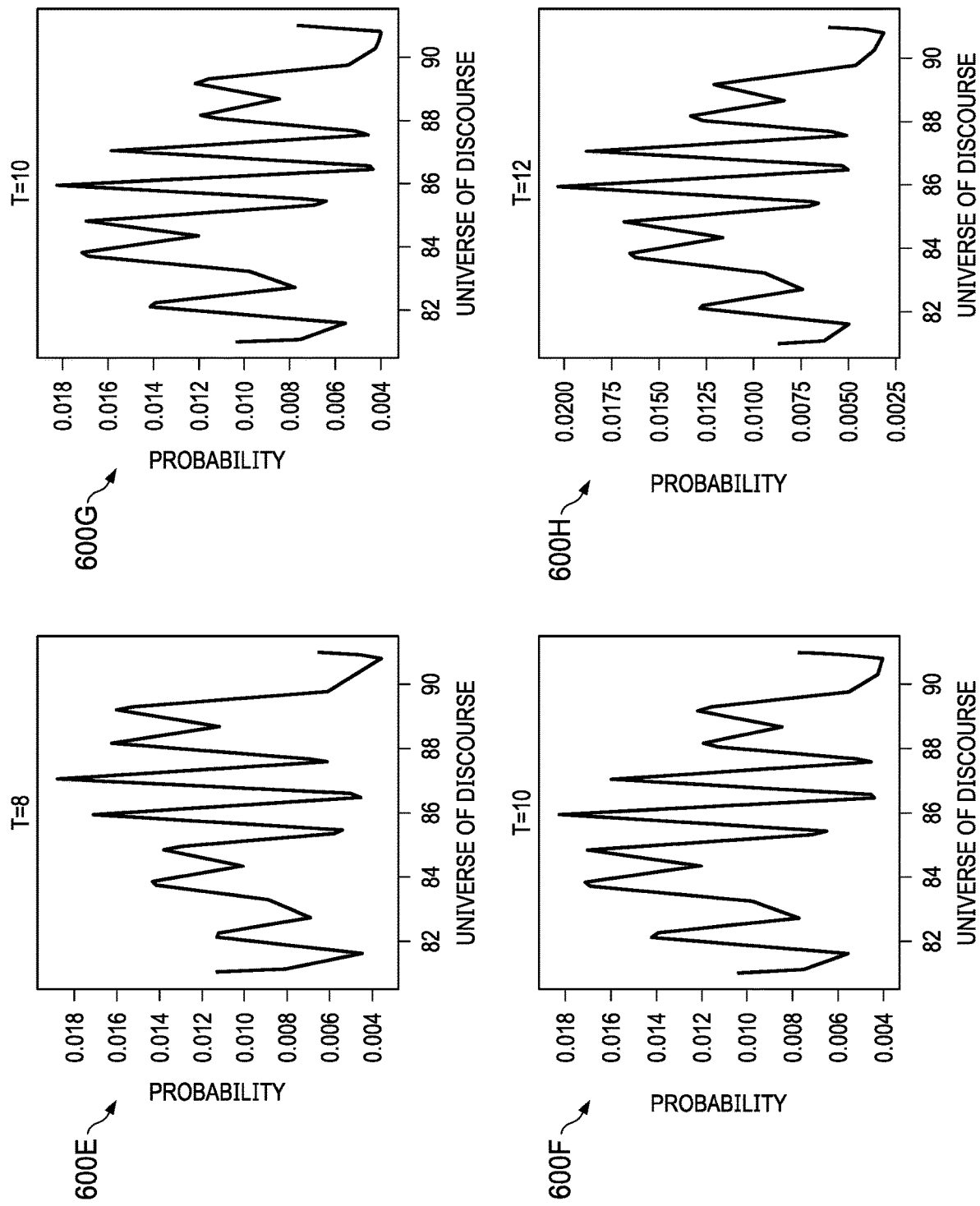

At block 304, method 300 may predict n-step ahead compute, for example, using a Probabilistic Weighted Fuzzy Time Series (PWFTS). System metrics-related information may be used to collect historical data as a time series (e.g., CPU, Memory, Disk 10 and Network) using suitable tools and the information may be stored in a database. An example of historical data (e.g., CPU idle %) is shown in table 400 of FIG. 4 and plotted as graph 500 of FIG. 5. Results of the prediction of block 600 are shown in graphs 600A-600L of FIGS. 6A-C ("probability" against "universe of discourse" for future times t=0 through t=20).

At block 305, method 300 dynamically identifies a maintenance window for transition time instances. Particularly, block 305 may obtain a transition set, each element of the set comprising a time of change and the transitioned level, from the compute forecast of block 304.

Conventionally, traditional maintenance window identification methods would require continuous monitoring of the resource utilization, and would give weight to spikes found in the resource utilization transitions. In contrast, using a PWFTS prediction of resource utilization as described herein, method 300 knows beforehand, at which time instances, the resource usage may change considerably. For example, we may define three (two or more) usage levels (K) based on which a maintenance window identification decision may be made, particularly: low usage level, medium usage level, and low usage level $$K=\{k:k\in 1,2,3\},\text{ respectively.}$$

In other embodiments, more levels may be defined depending upon a desired granularity and their boundaries may be altered. The maintenance window identification may be mapped and marked for each of the resource utilization instances. In this example, however, the mapping for K and Default Maintenance Window Identification Marking (DMWIM) $Th_K$ for that K against the resource utilization are shown below in Table II:

TABLE III

| Usage Level | Completion Time | K | DMWIM value to set ($Th_K$) |
|---|---|---|---|
| Low | 0%–10% | 1 | 1 |
| Medium | 10%–50% | 2 | 0 |
| High | 50%–100% | 3 | 0 |

Note that $Th_K$ takes one of two values "0" or "1," where "1" denotes a time instance conducive for a maintenance window, and "0" denotes a non-conducive time instance.

Now suppose the forecasting or prediction is made from $t_0$ onwards with a step $\delta$ in time, and i denotes every next instance. In that case, the set of time instances for which the prediction is made is given by:

$$T=\{t_i:i\in W\}$$

From the prediction, we obtain the transition points along with their transitioned level referring to the points where resource utilization moves from one usage level to the other. This transition of level is shown as:

$$k \to k_{new}|k_{new} \in \{K-k\}$$

And the transition set comprising of time of change and the transitioned level is:

$$T_{tn}=\{(t_{tn},k_{tn}):t_{tn}=t_i|t_i\in T \forall t_{i-1}{}^k \to t_i{}^{k_{new}}, k_{tn}=k_{new}\}$$

At these transition time instances, the DMWIM value is changed to the default DMWIM corresponding to final usage level to which transition has occurred. Once done, we no longer need to measure the resource utilization at every point.

For an IHS having the desired consecutive time instances values marked with the DMWIM value as 1, summing up to the time taken for cumulative update time for all components on that device model, those consecutive time instances be suggested as the recommended maintenance windows for that IHS.

At block 306, method 300 performs peak smoothening operation(s) to remove single point spikes from the transition set and thereby reduce the problem of avoiding frequent changes at the juncture of usage levels. Hence, the final transition set is given by:

$$T_{tn}=\{(t_{tn},k_{tn}):t_{tn}\ne t_i|t_i\in T_m \forall t_{i-1}{}^k=t_{i+1}{}^k, k_{tn}=k_{new}\}$$

Figure 7:
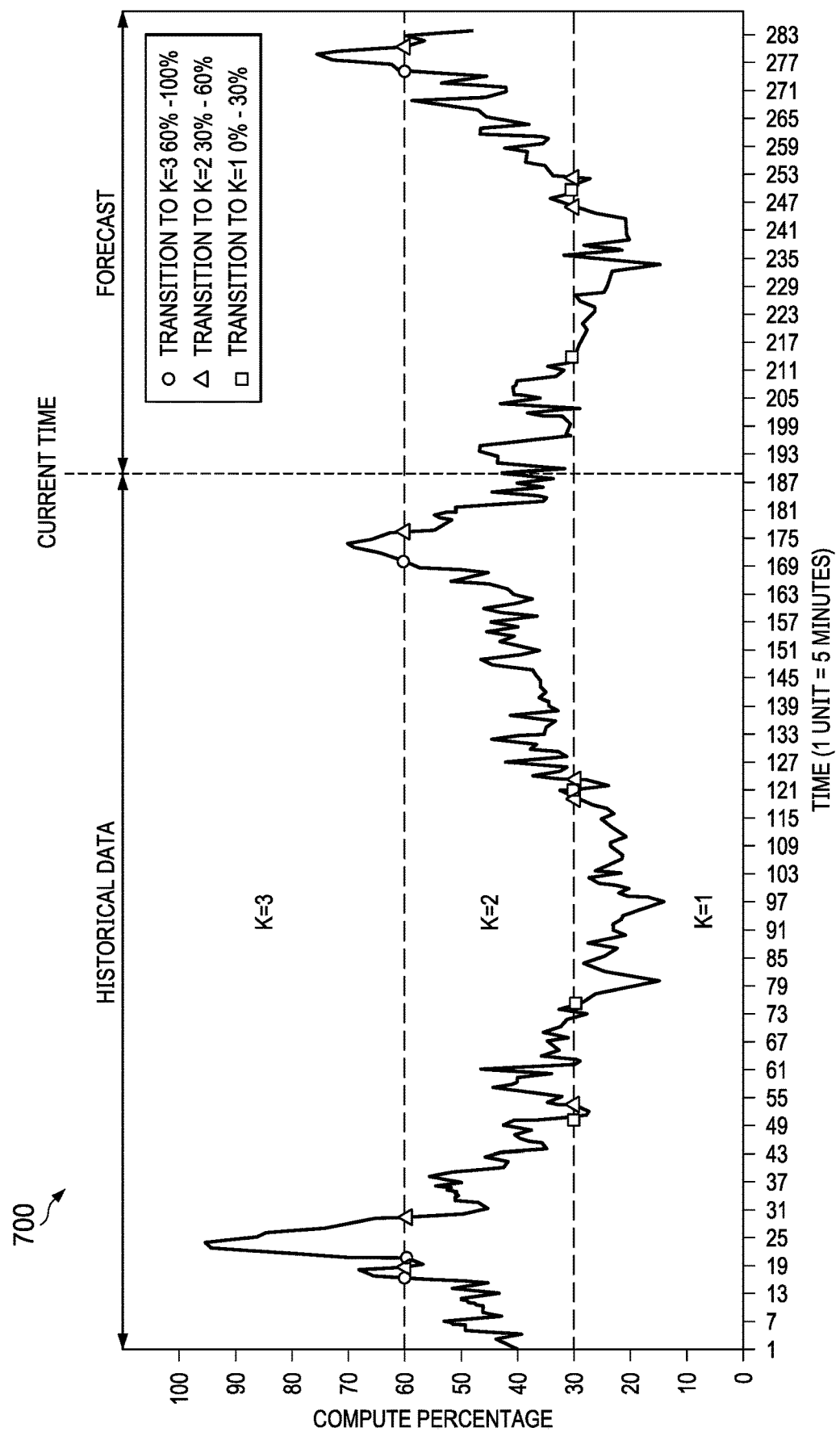
FIG. 7 is a graph of an example of a final transition set, according to some embodiments.

These points are shown in graph 700 of FIG. 7, illustrating historical an n-step ahead compute against time.

At block 307, method 300 performs continuous accuracy evaluation and/or improvement by calculating the relative deviation and update the DMWIM value based on a DMWIM adjustment mechanism. Method 300 gives better results the more accurate the forecast or prediction of resource utilization is. As the training size increases, the forecasting algorithm gives results closer to the reality. However, in case of a smaller training set, or workload change in the IHS, the prediction may show some deviation from actual utilization. In such case, the DMWIM may be dynamically altered to avoid wrong markings, especially for the value of K=1; where we would want to identify the IHS as "idle."

As such, an example of a continuous DMWIM adjustment mechanism is as follows: first, we make real-time observations ($R_a$) after every time step j such that j={ni:n∈N-1} where n is the monitoring frequency factor. Note here that n should be greater than 1 to avoid annulling the prediction benefits (and instead making too many or unnecessary measurements). We will denote the actual measure at time instance $t=t_i$ with $R_a{}^{t_i}$ and the predicted value for the same time instance as $R_p{}^{t_i}$. The deviation Δ between the actual resource utilization $R_a$ and the predicted value $R_p$ is monitored after every no time units and is compared with a predefined tolerance ε which denotes the relative deviation that can be tolerated. In case the relative deviation increases beyond E in magnitude, the DMWIM value for that instance is adjusted to "0."

At block 308, method 300 identifies a maintenance window. Particularly, block 308 may list one or more identified maintenance windows with the contiguous cumulative time period (for DMWIM=1) being greater than or equal to an overall completion time. For example, once the time instances have been marked with the values as set by the DMWIM, all the time windows are filtered for which: (a) the consecutive values are marked as "1," and (b) the cumulative time period for the consecutive marked values as "1" is equal or greater than the overall firmware update completion time.

In various embodiments, systems and methods described herein may provide autonomous dynamic maintenance window identification based on forecasted a-priori CPU resource utilization. Additionally, or alternatively, systems and methods described herein may provide a multivariate (e.g., CPU idle %, Disk I/O, Network, Memory, etc.) approach for Probabilistic Weighted Fuzzy Time Series (PWFTS) used for forecasting compute resource with a time complexity of O(n). Additionally, or alternatively, systems and methods described herein may provide dynamic maintenance window identification with adaptive compute change rate detection and correction. Additionally, or alternatively, systems and methods described herein may provide peak smoothening based accurate identification of exact maintenance window using single spike removal mechanism. Additionally, or alternatively, systems and methods described herein may provide a-priori resource allocation (based on prediction).

In some implementations, selection or suggestion of a time window for creating a firmware update package with the firmware update creation service may be based upon context information obtained by sensors 112. As such, the PWFTS may take such context information into account as input(s), along with other application or bundle information. For example, if the user is in the near-field during execution of a workload, the predicted utilization may be multiplied by a first weight or factor, if the user is in the mid-field during execution of the workload, the predicted utilization may be multiplied by a second weight or factor, or if the user is in the far-field during execution of the workload, the predicted utilization may be multiplied by a third weight or factor. Moreover, whether IHS 100 is a given posture, with a lid open or closed, and/or a first range of hinge angles during execution of a workload may also cause the predicted utilization for that workload to be multiplied by a different, empirically determined weight or factor.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
collect utilization data comprising data measuring utilization of the processor;
categorize the collected processor utilization data according to a plurality of usage levels, wherein a lowest of the usage levels corresponds to intervals suitable for IHS maintenance operations;
based on the collected utilization data, generate a time series of predicted processor utilization;
identify predicted transitions between the plurality of usage levels in the time series of predicted processor utilization;
identify a predicted idle interval without predicted transitions above the lowest of the usage levels; and
determine when a maintenance operation can be completed in the predicted idle interval.

2. The IHS of claim 1, wherein the maintenance operation comprises a firmware update operation.

3. The IHS of claim 1, wherein to determine an expected duration required to complete the maintenance operation, the program instructions, upon execution, further cause the IHS to add a first completion time of a first maintenance operation to a second completion time of a second maintenance operation.

4. The IHS of claim 3, wherein the expected duration required to complete the maintenance operation may add a time buffer to the first and second completion times.

5. The IHS of claim 1, wherein to generate the time series of predicted processor utilization, the program instructions, upon execution, further cause the IHS to use a multivariate time series analysis.

6. The IHS of claim 5, wherein the multivariate time series analysis comprises a probabilistic weighted fuzzy time series.

7. The IHS of claim 6, wherein to generate the time series of predicted processor utilization, the probabilistic weighted fuzzy time series utilizes weights that are selected based upon user context information.

8. The IHS of claim 7, wherein the user context information comprises a distance of a user from the IHS.

9. The IHS of claim 7, wherein the user context information comprises a posture in which the user has physically configured the IHS.

10. The IHS of claim 7, wherein the user context information comprises a hinge angle.

11. The IHS of claim 5, wherein to use the multivariate time series analysis, the program instructions, upon execution, further cause the IHS to use one or more parameters selected from the group consisting of: external input/output (I/O) attributes, internal I/O attributes, processor usage statistics, and memory consumption statistics.

12. The IHS of claim 1, wherein the predicted transitions between the plurality of usage levels comprise predictions whether the processor utilization will transition between different usage levels.

13. The IHS of claim 12, wherein the identification of predicted transitions between the plurality of usage levels comprises removal of one or more spikes from the time series of predicted processor utilization.

14. The IHS of claim 1, wherein the utilization data further comprises internal I/O data generated based on internal IHS communications and further comprises external I/O data generated based on external IHS communications.

15. A memory storage device having program instructions stored thereon that, upon execution by one or more processors of an Information Handling System (IHS), cause the IHS to:
collect utilization data comprising data measuring utilization of the processor;

categorize the collected processor utilization data according to a plurality of usage levels, wherein a lowest of the usage levels corresponds to an interval suitable for IHS maintenance operations;

based on the collected utilization data, generate a time series of predicted processor utilization;

identify predicted transitions between the plurality of usage levels in the time series of predicted processor utilization;

identify a predicted idle interval without predicted transitions above the lowest of the usage levels; and determine when a maintenance operation can be completed in the predicted idle interval.

16. The memory storage device of claim 15, wherein the identification of predicted transitions between the plurality of usage levels comprises removal of one or more spikes from the time series of predicted processor utilization.

17. A method, comprising:

collecting utilization data comprising data measuring utilization of the processor;

categorizing the collected processor utilization data according to a plurality of usage levels, wherein a lowest of the usage levels corresponds to intervals suitable for Information Handling System (IHS) maintenance operations;

based on the collected utilization data, generating a time series of predicted processor utilization;

identifying predicted transitions between the plurality of usage levels in the time series of predicted processor utilization;

identifying a predicted idle interval without predicted transitions above the lowest of the usage levels; and determining when a maintenance operation can be completed in the predicted idle interval.

18. The method of claim 17, wherein the time series of predicted processor utilization is generated through multi-variate time series.

* * * * *